United States Patent [19]

Kandachi et al.

[11] 4,439,222

[45] Mar. 27, 1984

[54] METHOD OF PRODUCING THIN SHEET GLASS OF HIGH QUALITY BY FLOAT PROCESS

[75] Inventors: Takayoshi Kandachi; Keizi Sueda; Minoru Suzuki, all of Matsusaka, Japan

[73] Assignee: Central Glass Company Limited, Ube, Japan

[21] Appl. No.: 403,321

[22] Filed: Jul. 30, 1982

[30] Foreign Application Priority Data

Jul. 31, 1981 [JP] Japan .............................. 56-120265
Sep. 11, 1981 [JP] Japan .............................. 56-143317

[51] Int. Cl.$^3$ ............................................. C03B 18/02
[52] U.S. Cl. .................................. 65/99.2; 65/99.5; 65/182.4; 65/182.5
[58] Field of Search .................... 65/99.2, 182.5, 182.4, 65/99.5

[56] References Cited

U.S. PATENT DOCUMENTS

| | | | |
|---|---|---|---|
| 3,442,636 | 5/1969 | Kita et al. | 65/182.4 |
| 3,607,203 | 9/1971 | Fujimoto et al. | 65/182.4 X |
| 3,637,361 | 1/1972 | Kita et al. | 65/99 X |
| 3,843,346 | 10/1974 | Edge et al. | 65/182.4 X |
| 3,850,787 | 11/1974 | Robinson et al. | 65/99.5 X |
| 4,361,431 | 11/1982 | Kandachi et al. | 65/182.4 X |

FOREIGN PATENT DOCUMENTS 674165 1/1966 Belgium .............................. 65/184.4
54-31012 9/1979 Japan .

Primary Examiner—Arthur D. Kellogg
Attorney, Agent, or Firm—Fleit, Jacobson, Cohn & Price

[57] ABSTRACT

A method of producing thin sheet glass by the float process, in which molten glass is formed into a thin layer on the surface of molten metal by making molten glass pass through a vertically narrow gap given by a sluice wall which extends above and transversely of the molten metal bath, and the molten glass layer is stretched to further reduce its thickness. By forming the sluice wall with a slant surface on the front side facing a pool of molten glass so as to smoothly introduce the molten glass into the gap beneath the wall and by using a practically isotropic graphite which is not greater than 23% in its porosity as the material of the sluice wall, defectless sheet glass thinner than 1 mm can be obtained. Preferably the porosity of the graphite is at least 9%. For the quality of the sheet glass, it is favorable to form the sluice wall with a vertical surface on the rear side and another slant surface which interposes between the lower edge of the slant front surface and the lower edge of the vertical rear surface to allow the molten metal beneath the wall to smoothly raise its level from a lowered level beneath the molten glass pool.

10 Claims, 7 Drawing Figures

METHOD OF PRODUCING THIN SHEET GLASS OF HIGH QUALITY BY FLOAT PROCESS

BACKGROUND OF THE INVENTION

This invention relates to an improved method of forming sheet glass by the float process wherein molten glass is delivered onto the surface of molten metal in a bath and is formed into a continuous sheet or ribbon while the glass is floating and advancing on the molten metal, the method being particularly suited to the production of sheet glass thinner than about one millimeter.

In the well known float process, molten glass is allowed to spread on the surface of a molten metal such as tin to form a glass layer which is gradually cooled while it is floating on the molten metal until it becomes a dimensionally stable, flat sheet or ribbon of glass. Under equilibrium conditions the molten glass layer floating on the molten metal will assume an equilibrium thickness of about 6 to 7 mm.

To produce a sheet glass thinner than equilibrium thickness by the float process, it is usual to stretch an unsolidified region of the glass ribbon on the molten metal along the direction of travel of the glass ribbon by applying a pulling or tractive force to the cooled and solidified region of the glass ribbon from the outside of the outlet end of the molten metal bath. In this case it is natural that a sideward constrictive force acts on the glass ribbon, and accordingly it is usual to oppose to the constrictive force by means of top or edge rolls that are arranged along and above the molten metal surface so as to engage lateral marginal regions of the glass ribbon. Therefore, the marginal regions of the glass ribbon at this stage need to be thick enough to surely engage the aforementioned rolls, but it becomes difficult to meet this requirement if the thickness of the glass ribbon in its flat major region is reduced unlimitedly. For this reason, it is very difficult to industrially produce a sheet glass thinner than about 2 mm by this technique.

In view of the above described difficulty, Japanese patent application Publication No. 54(1979)-31012 proposes to control the flow of molten glass on the molten metal by forming a sort of sluice at a short distance from the inlet end of the molten metal bath and heating the molten glass while it advances through this sluice. More particularly, the sluice is provided by an elongate solid block of a heat-resistant and electrically conducting material, which is fixedly disposed slightly above the surface of the molten metal to extend transversely of the advancing flow of the molten glass such that the molten glass on the molten metal in a region between the inlet end of the molten metal bath and the elongate solid block forms a pool and is forced to pass through the gap between the bottom face of the solid block and the surface of the molten metal to advance to the downstream. The heating of the molten glass is effected by making an electric current to flow through the molten glass between the sluice-forming block and the molten metal to generate Joule's heat. Also in this method a tractive force is imposed on the glass layer on the downstream side of the sluice-forming block. In fact, it is possible to produce sheet glass of very small thickness by this method.

However, we have recognized that when sheet glass thinner than about 1 mm is produced by the method of the quoted Japanese patent specification the obtained sheet glass exhibits distortion in the form of a number of continuous lines along the direction of the travel of glass on the molten metal and/or contains a number of small bubbles in the glass body. In our view, it is quite difficult to obtain sheet glass of commercially satisfactory quality by this method when the thickness of the sheet glass is smaller than about 1 mm. Besides, the electric heating of the molten glass at or in the vicinity of the sluice offers various problems to the glass forming operation and becomes a cause of lowering in productivity.

SUMMARY OF THE INVENTION

It is an object of the present invention to provide an improved method of forming sheet glass by the float process, which method enables to obtain flat sheet glass of a relatively small thickness with uniformly good quality even when the thickness is smaller than about 1 mm.

A method according to the invention is of the type forming a relatively thin sheet of glass in a glass forming chamber which includes a molten metal bath constituted of a bottom structure, two opposite side walls, a molten glass inlet structure at one end and a sheet glass outlet structure at the other end and a roof structure defining an interior space above the molten metal bath fundamentally by the steps of feeding molten glass onto the surface of the molten metal in the bath, allowing the molten glass to spread on the surface of the molten metal to form a molten glass layer, stretching the molten glass layer in a direction substantially parallel to the side walls so as to reduce the thickness of the molten glass layer and to advance this layer toward the outlet structure, and cooling the thinned molten glass layer. In this method, a sluice-forming wall is provided in the aforementioned interior space at a distance downstream from the molten glass inlet structure so as to extend widthways of the molten metal bath and to leave a vertically narrow gap between a lower end of the sluice-forming wall and the surface of the molten metal in the bath thereby producing a pool of the molten glass on the molten metal in a region between the inlet structure and the sluice-forming wall, and the aforementioned molten glass layer is formed by allowing the molten glass to flow out of the pool through the aforementioned vertically narrow gap. The improvement according to the invention resides essentially in that a practically isotropic graphite not greater than 23% in porosity is used as the material of the sluice-forming wall at least in its lower end portion making contact with the molten glass, and that the front side of the sluice-forming wall facing the molten glass pool is formed with a slant surface contiguous to the lower end of this wall such that the surface of the molten glass in the pool intersects this slant surface and that the vertical distance of the slant surface from the surface of the molten metal decreases as the horizontal distance of the slant surface from the aforementioned inlet structure increases.

The slant surface formed on the front side of the sluice-forming wall allows the molten glass to smoothly enter the gap between the sluice wall and the molten metal surface without stagnating on the front side of this wall and to encounter an increasing resistance of this wall as the glass flows toward the downstream. The use of a practically isotropic graphite having adequate porosity, which is a material not easily wetted with molten glass, as the material of the sluice-forming wall is highly effective for the production of thin sheet glass containing neither linear distortions nor small bubbles. It is preferred that the porosity of the employed graphite is at least 9%. Also it is preferred that the sluice-forming wall has a vertical surface on the rear side and another slant surface which interposes between the lower edge of the aforementioned slant surface and the lower edge of the vertical surface on the rear side such that the vertical distance of this slant surface from the molten metal surface increases as the horizontal distance of this slant surface from the inlet end of the molten metal bath increases. As the effect of such shaping of the sluice-forming wall, the parting of the flowing molten glass from the rear side of the sluice-forming wall becomes very smooth, so that the advance of the molten glass formed into a thin layer by the sluice-forming wall is not irregularly disturbed even though an attraction force attributed to the affinity of the molten glass for the sluice-forming wall is not uniform over the entire length of the sluice-forming wall extending widthways of the molten glass layer.

As a joint effect of the above described shape and material of the sluice-forming wall, the molten glass can be formed into a thin layer and further stretched without loosing uniformity and, therefore, sheet glass produced by this method is free from linear distortions and small bubbles even when the sheet glass is thinner than 1 mm.

In the method according to the invention, the shaping of the molten glass into a thin layer by using the sluice-forming wall is accomplished without particularly heating the molten glass because we have confirmed that heating of the molten glass at this stage is liable to cause reboiling of the molten glass with generation of bubbles in the molten glass, and that when heating is effected by the flow of an electric current through the molten glass there arises additional causes of bubbling in the molten glass.

DESCRIPTION OF THE PREFERRED EMBODIMENTS

Figure 1:
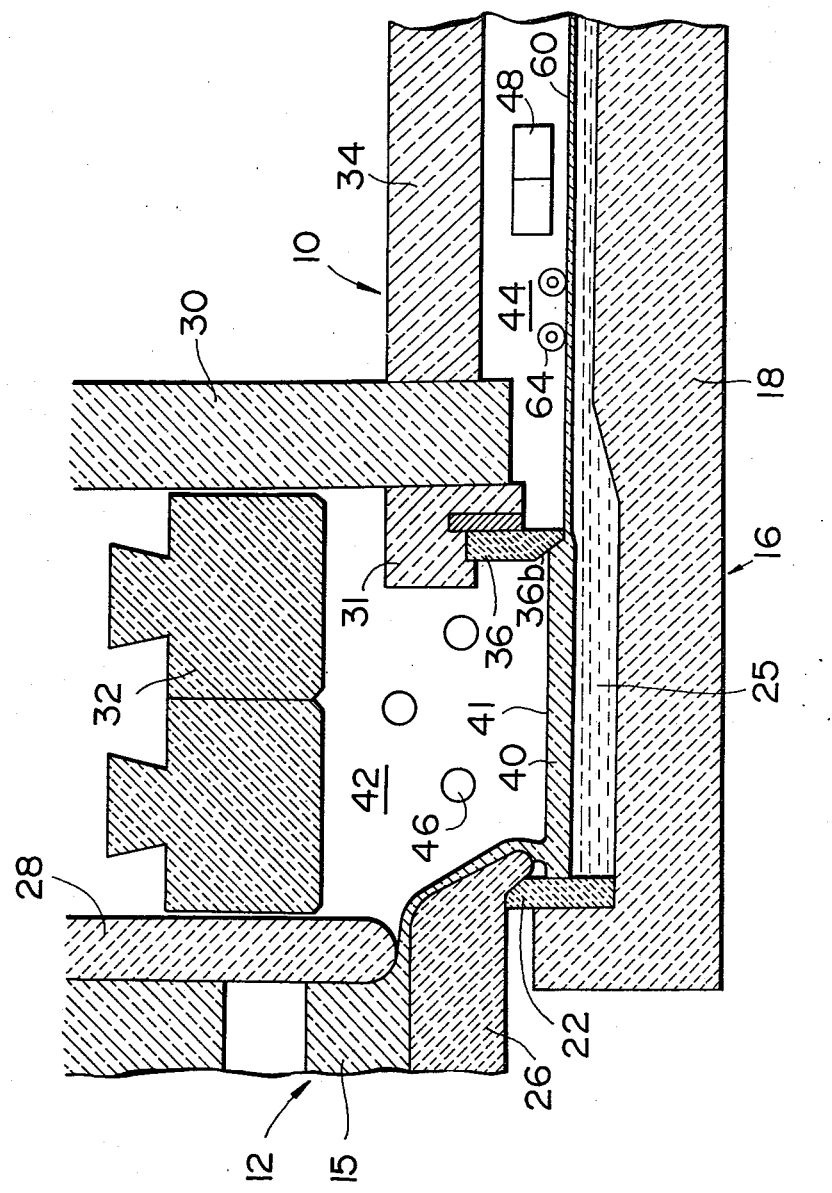
FIG. 1 is a sectional side elevation view of a glass forming apparatus used in a method according to the invention.
Figure 2:
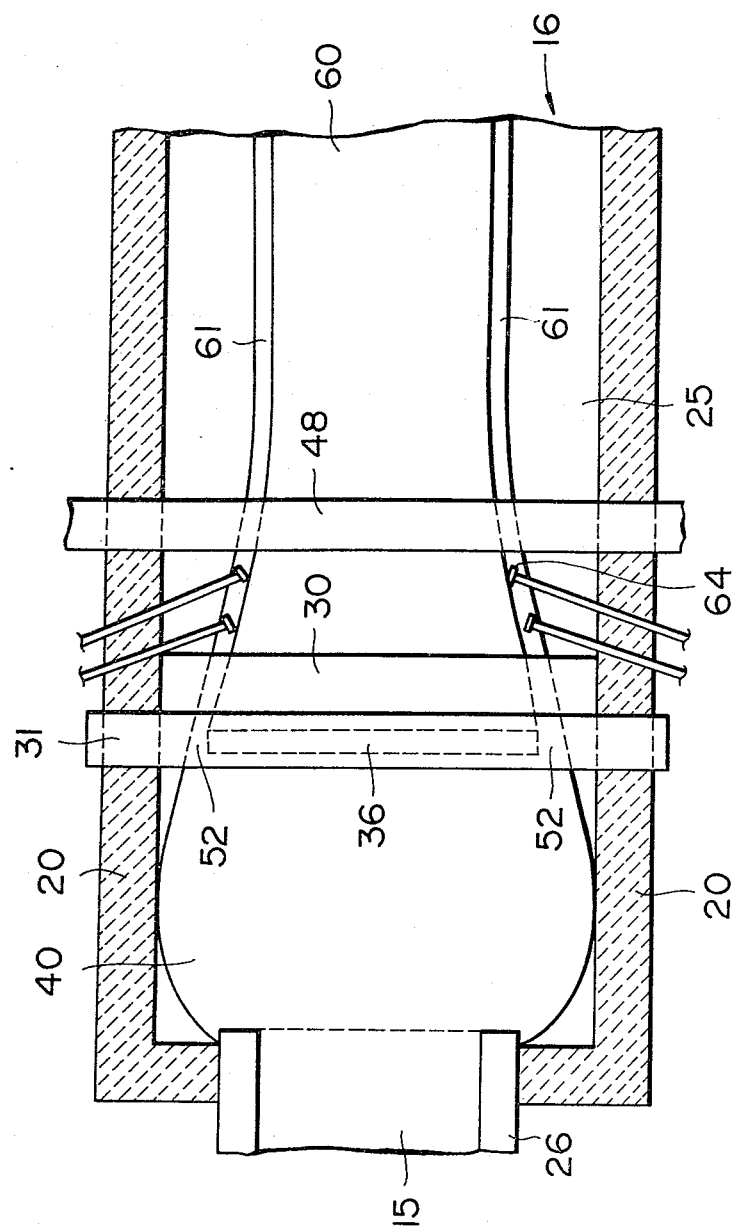
FIG. 2 is a fragmentary plan view of the apparatus of FIG. 1.

FIGS. 1 and 2 show a float process glass forming chamber 10 in which a sheet glass is formed by a method according to the invention. A canal 12 connects this glass forming chamber 10 to a glass melting and refining tank furnace (not shown). In this chamber 10, a refractory bottom 18, two refractory side walls 20 extending longitudinally of the chamber and a refractory wetback tile 22 located at the inlet end constitute a molten metal bath 16 filled with a molten metal 25 such as tin or its alloy. The inlet to the molten metal bath 16 is constituted of a refractory lip tile 26 and a control tweel 28 made of a refractory material in the well known manner. At a suitable distance from the inlet end and above the refractory bottom 18, a heat-insulating wall 30 spans the two side walls 20 such that the lower end of this wall 30 is somewhat distant from the surface of the molten metal 25. A roof structure of the chamber 10 in a region between the inlet end and the heat-insulating wall 30 takes the form of flat arch 32 that provides a relatively high ceiling, whereas a roof 34 in a region downstream of the wall 30 provides a relatively low ceiling.

Adjacent to and upstream of the heat-insulating wall 30 there is an auxiliary heat-insulating wall 31 which spans the two side walls 20 but leaves a considerably large gap between its lower end and the surface of the molten metal 25, and a sluice-forming block 36 in the form of a vertical wall (hereinafter this block 36 will be called sluice wall) is fixed to the auxiliary heat-insulating wall 31. The sluice wall 36 extends transversely of the molten metal bath 16 but terminates at some distances from the two side walls 20 as can be seen in FIG. 2. There is only a very short vertical distance between the lower end of the sluice wall 36 and the surface of the molten metal 25. Therefore, when molten glass 15 is introduced into the molten metal bath 16 as a downward stream along the surface of the lip tile 26 at a suitable flow rate determined by the vertical position of the control tweel 28, there is formed a pool 40 of molten glass on the molten metal 25 between the wetback tile 22 and the sluice wall 36, though the molten glass can gradually and continuously flow out of the pool 40 through the gap between the sluice wall 36 and the molten metal 25 and also through lateral gaps 52 between the sluice wall 36 and the side walls 20.

Thus, the heat-insulating wall 30 and the sluice wall 36 divide the interior space of the glass forming chamber 10 into an upstream space 42 and a downstream space 44. In the upstream space 42, there are heater elements 46 located above the molten glass pool 40 for the purpose of heating the gas atmosphere in this space 42 thereby preventing undesirable lowering in the temperature of the molten glass by natural radiation of heat. In the downsteam space 44 there is a cooler 48 to cool the gas atmosphere in this space. To prevent oxidation of the molten metal 25, a non-oxidizing gas such as a mixture of nitrogen and hydrogen is introduced into the downstream space 44 in the glass forming chamber 10 through gas ducts (not shown) provided in the roof 34. The molten metal bath 16 may have a substantially uniform depth, but preferably the bottom refractory 18 is shaped such that the molten metal bath 16 has a relatively deep region extending from the inlet end to the position of the heat-insulating wall 30 and a relatively shallow region extending to the outlet end with a view to suppressing convection of the molten metal 25 by the effect of the heat supplied from the molten glass.

As the molten glass 15 is continuously supplied to the molten glass pool 40, the molten glass in the pool 40 gradually flows to the downstream partly through the narrow gap between the sluice wall 36 and the molten metal 25 and partly through the lateral gaps 52 between the sluice wall 36 and the side walls 20. By passing through the narrow gap between the sluice wall 36 and the molten metal 25, the molten glass becomes a thin layer or ribbon 60 floating on the molten metal 25. A pulling or tractive force is applied to the glass ribbon 60 by the revolutions of liftout rolls (not shown) which are arranged outside of the outlet end of the glass forming chamber 10 and also by the action of conveyor rolls (not shown) arranged subsequently to the liftout rolls. Therefore, the glass ribbon 60 undergoes stretching and advances along the surface of the molten metal 25 toward the outlet end of the molten metal bath. While advancing in such a way, the glass ribbon 60 undergoes gradual cooling and becomes dimensionally stable before its arrival at the outlet end. As will be understood, the ultimate thickness of the glass ribbon 60 is not directly determined by the vertical width of the gap between the sluice wall 36 and the molten metal surface and depends on other factors such as the viscosity of the molten glass, the magnitude of the aforementioned tractive force and/or the advance speed of the glass ribbon 60.

Since a portion of the molten glass in the pool 40 flows out through the side gaps 52 between the sluice wall 36 and the side walls 20 without passing through the narrow gap between the sluice wall 36 and the molten metal 25, the glass ribbon 60 has side marginal regions 61 where the thickness is considerably greater than in the flat major region. Accordingly the glass forming chamber 10 may optionally be provided with top or edge rolls 64 arranged so as to engage the side marginal regions 61 of the glass ribbon 60 from the upper side for the purpose of suppressing lateral constriction of the glass ribbon 60.

Figure 3:
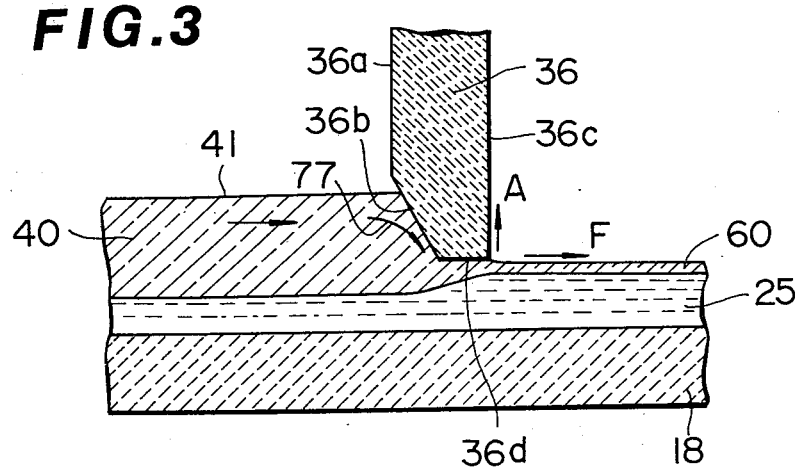
FIG. 3 is an enlargement of a sluice region in FIG. 1 for explanation of the primary features of a method according to the invention.

Referring to FIG. 3, the sluice wall 36 employed in the present invention will be described more in detail. As the primary features of the invention the sluice wall 36 is, either entirely or only in a lower end portion making contact with the molten glass 40, made of an isotropic graphite which is not greater than 23% in porosity and has a slant surface 36b in its lower end portion. As will be understood from the foregoing description and illustration, only a lower end portion of the sluice wall 36 makes contact with the molten glass. Accordingly, neither the material nor the shape of the remaining upper portion of this wall 36 is a matter of importance. On the front side facing the pool 40 of molten glass, the illustrated sluice wall 36 has a vertical and flat surface 36a in its upper portion, but this is merely for the sake of convenience.

The slant surface 36b of the sluice wall 36 is formed such that the surface 41 of the molten glass pool 40 always intersects this slant surface 36b, and that the vertical distance between this slant surface 36b and the surface of the molten metal 25 decreases as the horizontal distance of the slant surface 36b from the inlet end of the molten metal bath 16 increases. In other words, the molten glass flowing through the gap between the sluice wall 36 and the molten metal 25 encounters an increasing resistance of the sluice wall 36 as the glass advances to the downstream. On the rear side, the lower end portion of the sluice wall 36 has a vertical and flat surface 36c which terminates at the lower end of the sluice wall 36. The illustrated sluice wall 36 has a flat and horizontal surface 36d as its lower end face interposing between the slant surface 36b and the vertical surface 36c, but this is not limitative.

The above described shape of the lower end portion of the sluice wall 36 has been devised based on our discovery that the appearance of linear distortions on thin sheet glass produced by the method of the above referred Japanese patent specification No. 54(1979)-31012 is attributed largely to the shape of the sluice-forming block or wall.

Figure 4:
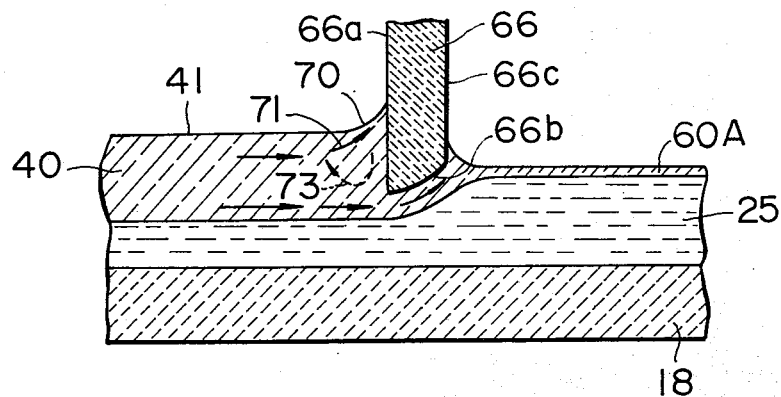
FIGS. 4 and 5 show two differently designed prior art sluice-forming blocks, in the same view as FIG. 3.
Figure 5:
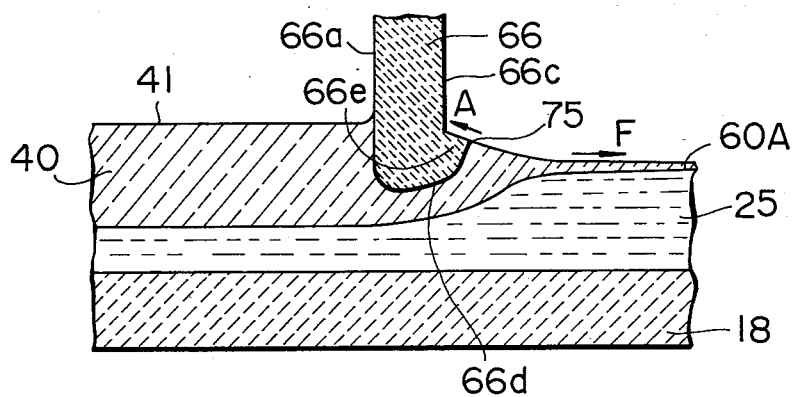

For comparison, FIGS. 4 and 5 show two shapes of sluice wall 66 recommended in the above referred Japanese patent specification in the same sectional views as FIG. 3.

In FIG. 4, a lower end portion of the sluice wall 66 has a vertical surface 66a on the front side, and a slant (and slightly curved) surface 66b extends from the lower end of the vertical surface 66a to a vertical surface 66c on the rear side such that the vertical distance between the slant surface 66b and the surface of the molten metal 25 increases as the horizontal distance of the slant surface 66b from the inlet end of the molten metal bath increases. In this case the surface 41 of the molten glass pool 40 intersects the front vertical surface 66a of the sluice wall 66. Therefore, a portion of the molten glass near the pool surface 41 does not smoothly flow into the gap between the lower end of the wall 66 and the molten metal 25 and, therefore, stagnates along the front surface 66a of the wall 66 as represented by arrows 71, 73 to form a gob 70 along the intersection line between the glass surface 41 and the wall surface 66a. Due to this phenomenon the upper portion of the molten glass stays in the pool 40 for a longer period of time than the lower portion of the molten glass, so that the molten glass passing through the gap beneath the sluice wall 66 becomes nonuniform in viscosity. When a resultant glass ribbon 60A is stretched to turn into a thin glass, the nonuniformity in the viscosity of the molten glass comes out as linear distortions in the sheet glass.

In FIG. 5, the lower end of the prior art sluice wall 66 is shaped into a rounded and very gently slanting surface 66d. The vertical distance between this rounded surface 66d and the surface of the molten metal 25 increases as the horizontal distance of the rounded surface from the inlet end of the molten metal bath increases. On the rear side this sluice wall 66 is formed with a projection 66e having a sharp edge 75 at which the rounded surface 66d terminates. Because of the rounded and gently slanting shape of the lower end face 66d, the possibility of stagnation of an upper portion of the molten glass to result in the formation of a gob on the front side of the sluice wall 66 will lessen in this case. However, a thin sheet glass produced by using this sluice wall 66 still suffers from linear distortions. There are two presumable reasons. The first reason is nonuniform stretching of the glass ribbon 60A due to the existence of the projection 66e of the sluice wall 66. In this case a reaction force to the tracting and stretching force applied to the upper and lower surfaces of the glass ribbon 60A does not uniformly distribute over the contacting surface between the molten glass and the sluice wall 66 and significantly concentrates at the sharp edge 75 of the projection 66e. The glass ribbon 60A is stretched immediatly after separation from the sluice wall 66 at its edge 75, and particularly great stretching of the glass ribbon 60A occurs at its upper surface contiguous to the edge 75 of the wall 66. Such a manner of locally intensified stretching becomes a cause of linear distortions in a surface region of the obtained sheet glass. As the second reason, an attraction force attributed to the affinity of the molten glass for the sluice wall 66 acts on the glass ribbon 60A in unfavorable directions. Since the projection 66e of the sluice wall 66 has a slant surface between the sharp edge 75 and the vertical surface 66c, the attraction force represented by arrow A has a component reverse to the principal direction, represented by arrow F, of stretching of the glass ribbon 60A. Therefore, slight nonuniformity of the distribution of the attraction force over the width of the glass ribbion 60A renders the stretching force nonuniform and consequentially becomes a cause of linear distortions in the formed sheet glass. Furthermore, the action of the attraction force in the direction reverse to the direction of the stretching force causes a portion of the molten glass to stagnate along the surfaces of the projection 66e of the sluice wall 66 as an additional cause of the linear distortions in the formed sheet glass.

Referring again to FIG. 3, the slant surface 36b of the sluice wall 36 employed in the present invention allows the molten glass in the pool 40 to smoothly enter the gap between the lower end 36d of this wall 36 and the molten metal 25. Accordingly even an upper portion of the molten glass in the pool 40 advances smoothly as represented by arrow 77 and scarcely tends to stagnate along the surfaces of the sluice wall 36. As an additional advantage of the slant surface 36d, the flow of the molten glass increases its velocity as it approaches the downstream end of the gap between the sluice wall 36 and the molten metal 25, so that there arises a considerable viscosity resistance of the molten glass to serve as a reaction force to the stretching force acting on the glass ribbon 66 with the effect of dissolving the concentration of reaction force at the edge where the vertical surface 36c of the wall 36 and the surface of the molten glass intersect. Furthermore, in this case it is unnecessary to greatly stretch the glass ribbon 60 in a region immediately downstream from the sluice wall 36 because the thickness of the glass at the downstream end of the gap between the wall 36 and the molten metal 25 is already very small.

The contact of the molten glass with the sluice wall 36 terminates at the lower edge of the rear vertical surface 36c of the wall 36.

Therefore, the attraction force A attributed to the affinity of the molten glass for the sluice wall 36 acts on the glass ribbon 60 only in the direction perpendicular to the principal direction F of the stretching force. This means that nonuniform distribution of the attraction force A over the width of the glass ribbon 60 has no influence on the uniformity of the stretching force F. Besides, there is no possibility of stagnation of the molten glass along the rear surface 36c of the sluice wall 36 by the action of the attraction force A. For these reasons it has become possible to form a thin sheet glass free from linear distortions by using this sluice wall 36.

As to the material of the sluice wall 36, initially we have considered that a relatively wide choice can be made from among heat-resistant materials which are not easily wetted with molten glass. At last, however, we have discovered that the use of a practically isotropic graphite having an adequate porosity as the sluice wall material is distinctly effective for the prevention of appearance of linear distortions or small bubbles in a relatively thin sheet glass formed by the above described method.

The upper boundary of the porosity of the graphite is set at 23% because both the reactivity of the graphite sluice wall 36 at its surfaces with molten glass and wettability of the graphite with molten glass increase as the porosity increases so that the use of graphite greater than 23% in porosity might result in appearance of minute undulations on the surface of the produced sheet glass. The pores in the graphite sluice wall 36 serves the purpose of rapidly diffusing a certain amount of gas developed at the interface between the wall 36 and the molten glass thereby preventing the formed sheet glass from containing samll bubbles. From this point of view, it is preferred that the porosity of the employed graphite is at least 9%. There is a definite relationship between the porosity of isotropic graphite and its bulk density: the bulk density becomes 2.10 when the porosity is 9% and 1.77 when the porosity is 23%.

Besides, it is preferred that the particle size of the carbon particles in the employed graphite is not larger than 0.1 mm because a larger size of the carbon particles makes it difficult to form the sluice wall 36 with sufficiently high smoothness of the wall surfaces and, therefore, raises a possibility of minute undulations on the surface of the sheet glass formed by using the sluice wall 36.

If use is made of graphite high in anisotropy as the material of the sluice wall 36, the sluice wall 36 will possibly wear nonuniformly by the continued action of molten glass thereon during industrial use thereof even though the sluice wall is initially shaped by high precision machining, and nonuniform wear of the sluice wall 36 will offer difficulty in obtaining thin sheet glass of satisfactorily high quality. In the present invention, therefore, use is made of a practically isotropic graphite which does not exhibit anisotropy in a practical sense in its physical properties including wear resistance. Besides the greatly favorable effects on the quality of the produced sheet glass, the use of such an isotropic graphite as the sluice wall material makes it possible to continuously and long use the sluice wall 36 in the industrial production of thin sheet glass.

Figure 6:
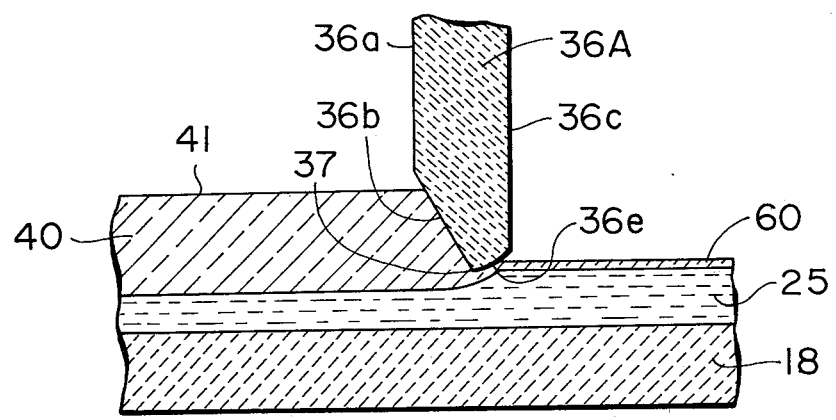
FIG. 6 shows a preferred modification of the shape of the sluice-forming wall of FIG. 3 in a similar sectional view.

FIG. 6 shows a preferred modification of the shape of the lower end portion of the sluice wall 36 of FIG. 3. In FIG. 3 the lower end of the sluice wall 36 is the flat and horizontal surface 36d, but the modified sluice wall 36A of FIG. 6 has a slant surface 36e which interposes between the lower edge of the slant surface 36b on the front side and the lower edge of the vertical surface 36c on the rear side such that the intersection edge 37 between the two slant surfaces 36b and 36e becomes the lower end of the sluice wall 36A. In FIG. 6 the slant surface 36e is a slightly convex surface, but alternatively this surface 36e may be a flat surface.

Figure 7:
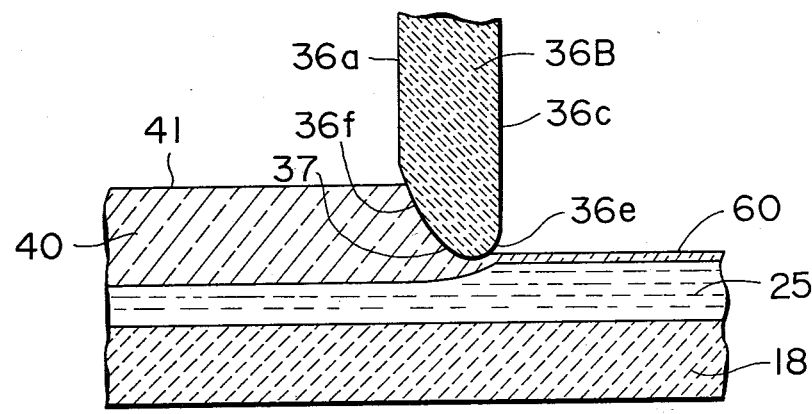
FIG. 7 shows another preferred modification of the shape of the sluice-forming wall of FIG. 3 in a similar sectional view.

Compared with the horizontal lower end face 36d of the sluice wall 36 in FIG. 3, the slant surface 36e in FIG. 6 is more effective for smoothing of an upward movement of the molten metal 25, which is forced downward by the weight of the molten glass in the pool 40, at the location of the sluice wall 36A. Furthermore, the parting of the molten glass from this sluice wall 36A occurs on this slant surface 36e, not on the vertical rear surface 36c, with the effect that the possibility of concentration of the above explained reaction force attributed to the viscosity resistance of the molten glass is further reduced. Accordingly it is further ensured that the sheet glass produced by this method is free from minute defects such as linear distortions or small bubbles even when the sheet glass is thinner than 1 mm. FIG. 7 shows a further modification of the sluice wall 36A of FIG. 6. On the front side of the modified sluice wall 36B of FIG. 7, there is a slant and convexly rounded surface 36f instead of the slant and flat surface 36b in FIGS. 3 and 6. This slant and rounded surface 36f is smoothly contiguous to the lower slant surface 36e described with reference to FIG. 6, so that the lower end 37 of this sluice wall 36B does not become a sharp edge. The rounding of the front slant surface 36f is effective for further smoothing of the flow of the molten glass in the pool 40 into the narrow gap between the sluice wall 36B and the molten metal 25 and, hence, is favorable for the quality of the produced sheet glass.

What is claimed is:

1. In a method of producing a relatively thin sheet glass in a glass forming chamber which includes a molten metal bath constituted of a bottom structure, two opposite side walls, a molten glass inlet structure at one end and a sheet glass outlet structure at the other end and a roof structure defining an interior space above the molten metal bath, the method being of the type having the steps of feeding molten glass onto the surface of the molten metal in the bath, allowing the molten glass to spread on the surface of the molten metal to form a molten glass layer, stretching the molten glass layer in a direction substantially parallel to the side walls so as to reduce the thickness of the molten glass layer and to advance the molten glass layer toward the outlet structure and cooling the molten glass layer, and further having the step of providing a sluice-forming wall in said interior space at a distance downstream from the inlet structure so as to extend widthways of the molten metal bath and to leave a vertically narrow gap between a lower end of the sluice-forming wall and the surface of the molten metal in the bath thereby producing a pool of the molten glass on the molten metal in a region between the inlet structure and the sluice-forming wall to form said molten glass layer by allowing the molten glass to flow out of said pool through said vertically narrow gap, the improvement comprising using a practically isotropic graphite which is not greater than 23% in porosity as the material of said sluice-forming wall at least in its lower end portion making contact with the molten glass, a front side of the sluice-forming wall facing said pool being formed with a slant surface contiguous to the lower end of the sluice-forming wall such that the surface of the molten glass in said pool intersects said slant surface and that the vertical distance of said slant surface from the surface of the molten metal decreases as the horizontal distance of said slant surface from said inlet structure increases.

2. A method according to claim 1, wherein the porosity of said graphite is at least 9%.

3. A method according to claim 2, wherein the particle size of carbon particles in said graphite is not larger than 0.1 mm.

4. A method according to claim 1, wherein the bulk density of said graphite is in the range from 1.77 to 2.10.

5. A method according to claim 1, wherein the rear side of said sluice-forming wall is formed with a vertical surface such that the lower edge of said vertical surface is rearward of the lower edge of said slant surface.

6. A method according to claim 5, wherein said sluice-forming wall is formed with another slant surface which interposes between the lower edge of said slant surface on the front side and the lower edge of said vertical surface on the rear side such that the vertical distance of said another slant surface from the surface of the molten metal increases as the horizontal distance of said another slant surface from said inlet structure increses.

7. A method according to claim 6, wherein said another slant surface is convexly rounded.

8. A method according to claim 6 or 7, wherein said slant surface on the front side is a substantially flat surface.

9. A method according to claim 6 or 7, wherein said slant surface on the front side is a convexly rounded surface.

10. A method according to claim 5, wherein said sluice-forming wall is formed with a substantially flat and horizontal surface which interposes between the lower edge of said slant surface and the lower edge of said vertical surface to become the lower end face of said sluice-forming wall.

* * * * *